Patented Dec. 16, 1952

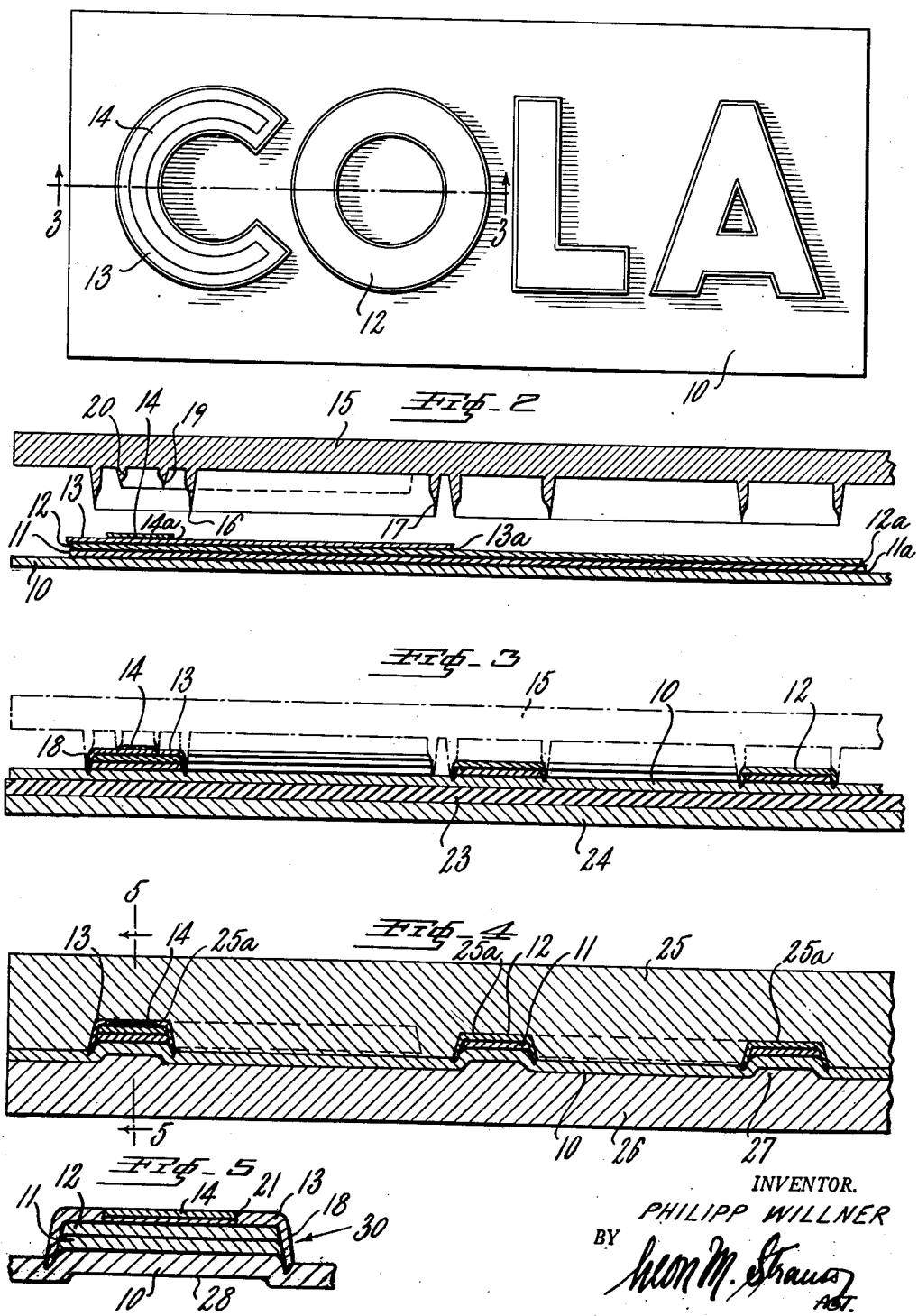

2,621,432

UNITED STATES PATENT OFFICE 2,621,432

LAMINATED ADVERTISING STRUCTURE

Philipp Willner, New York, N. Y.

Application August 27, 1949, Serial No. 112,706

1 Claim. (Cl. 40—135)

This invention relates to laminated structures for advertising or similar purposes and further to a method of manufacturing such structures.

It is an object of the present invention to provide a laminated structure of the aforesaid type which lends itself to the forming of letters, figures or designs by simple cutting and embossing operations whereby to obtain letters, etc. in raised fashion and affixed to a base sheet or plate.

It is another object of the invention to provide a laminated raised letter or like structure upon a base layer or plate, side edges defining said letters, figures or designs being so fashioned that the side edges of the individual letters are smooth, taut and distinct, the uppermost lamination being cut and folded downwardly over the side edges of the laminations therebelow.

It is a further object of the present invention to provide a laminated structure of the aforesaid character, to which additional height may be imparted relatively to the base sheet or plate by suitable embossing operations.

Another object of the invention is to provide method and means for obtaining laminated structures adapted to form raised letters, figures or designs on a base plate, said laminated structure being simple and inexpensive to manufacture, of pleasing appearance, endurable and wear resistant, bound and set by thermoplastic adhesive means, requires a minimum of working operations to construct and simple tools.

For a better understanding of the invention, reference is made to the following description taken in connection with the accompanying drawing, in which:

Fig. 1 is a plan view of the completed laminated structure embodying features of the present invention.

Fig. 2 is a fragmentary and collective view, in section, of the cutting tool and of the laminated structure before it is cut by means of said tool.

Fig. 3 is a fragmentary sectional view of the laminated structure after cutting operation, illustration being made of the tool in its cutting end position.

Fig. 4 is a fragmentary sectional view taken through embossing dies subsequently applied to the cut and laminated structure and the base sheet thereof.

Fig. 5 is an enlarged sectional view taken generally on line 5—5 of Fig. 4 and showing clearly the manner in which the uppermost layer is turned downwardly over the edges of the lower lamination and inserted into the base sheet.

Referring now to the drawing and particularly to Fig. 2, there is shown a base plate 10 on which laminations 11, 12 and 13 are superpositioned with thermoplastic adhesive layers 11a, 12a and 13a between the base plate and the respective laminations. On the uppermost or top lamination 13 there may be provided for further decorative purposes still another sheet 14 with thermoplastic layer 14a, said sheet 14 being of a different color and/or material than the aforesaid laminations 10, 11, 12 and 13. Laminations 13, 12 and 11 are to conform generally to the letter to be struck by cutting member or die 15.

This cutting member 15 has depending cutting projections or knife edges 16 conforming to the letters to be struck. The inner faces of the cutting edges are somewhat rounded whereby, as the cutting member 15 is applied in the manner illustrated in Fig. 3, the top lamination 13 will be cut and folded downwardly along the side edges in the manner indicated at 18, over the cut edges of the laminations 11, 12 lying therebelow. This will give the letters a finely finished and well rounded appearance.

The cutting member may also be provided with internal depending cutting edges 19 of less length than the cutting edges 16 and rounded on their inner faces as indicated at 20, whereby to cause the preferably narrow layer or lamination 14 to be cut and turned into the main top lamination 13 in the manner indicated at 21 in Fig. 5.

During the cutting operation, the base sheet 10 united with the laminations can be rested upon a fibre board 23 supported upon a working table 24 of a press (not shown).

The waste of the cut laminations 11, 12, 13 and 14 may be readily and subsequently removed without displacing the effective cut parts (making up the letters, etc.) since the knife edges are preferably heated and set in a preliminary manner the thermoplastic adhesive layers at the outer edges of these cut parts.

Due to the cutting operation and construction of the cutting knife, lamination 11 becomes slightly forced into and engaged with the base plate 10. Thus, a relatively stable and sufficiently strong lodgement of the laminations with respect to the base sheet or plate is attained for the waste removing and ensuing embossing operation.

As shown in Fig. 3, the letters succeeding the first letter may have a different arrangement of laminations and may have fewer laminations so that the height of the subsequent letter, say, O, will not be as high as the first letter, C, of the "COLA" sign.

The narrow layer 14 can be formed of metal foil. Likewise, the top lamination 13 can also be of metal foil. The other laminations 11, 12 and base 10 are preferably formed of paper of heavy consistency, cardboard, leather and like material.

Once the letters have been cut, the structure can be disposed between pressing and embossing dies 25 and 26. The female embossing die 25 is suitably grooved to receive and house the cut letters. The side edges of the grooves 25a of die 25 converge slightly toward the bottom of each groove which is somewhat smaller in overall dimension than the cut top lamination 13 with which the groove bottom coacts. Thus, lamination 13 (together with lamination 14) is rolled over, folded against and glued against the side edges of laminations located therebelow.

The male embossing die 26 has raised formations 27 adapted to match with the grooves 25a and cause the laminated structure 30 to be forced upwardly into the grooves 25a thereby providing an indentation 28 on the underface of the base sheet 10. Simultaneously, heat is applied through the dies 25 and/or 26 so that the thermoplastic adhesive will become finally set. The letters are thus raised from the base sheet and become an integral mass with the edges of the latter well covered so that the edges of the lower laminations will substantially not appear. The narrow strip 14, however, remains pressed into and seated in the top lamination 13, as it is apparent from Fig. 5.

It should now be evident that there has been provided a simple method of forming a lettering upon a base plate, wherein each of the letters forms an integral mass and raised upon the base sheet. The method consists of stacking or superimposing laminations upon the base sheet with a thermoplastic adhesive therebetween, thereafter cutting with cutting means the laminations to thereby provide the letters upon the base sheet, the cutting being effected into the upper surface of the base sheet. Simultaneously the edges of the uppermost or top lamination 13 are rolled downwardly over the side edges of the laminations lying below, whereby to cover up the edges of the lower laminations. Thereafter the assembled structure is placed between embossing plates and with the application of heat, the cut laminated portions are pressed to provide the integral article. Upon the thermoplastic adhesive layers becoming set, the laminated mass is made secure upon the base sheet and the laminations secure with one another. It will be apparent that any number of laminations can be used and that different color arrangements of the laminations can be effected.

The cutting tool as shown in Fig. 2 may have in addition to the cutting edge an inner curved, pressing and shaping formation for rolling the side edges of the uppermost or top lamination over the lower laminations. In order to effect the fitting of the edges of the aforesaid narrow lamination 14 in the top or main lamination 13, shortened cutting edges with inner shaping formation are provided which penetrate lamination 13 to a predetermined extent.

For the top as well as for the narrow laminae, plastic, silk, metal, cellophane, Celluloid, leather or similar finished or shiny sheet material may be employed, the top and narrow laminae being preferably of contrasting colors.

The invention may find use in various fields of the industry and may be applied to decorative boxes, name plates, show or display cards, placards, etc. If desired, the letters produced according to this invention may be separated from the base sheet or the latter may be suitably cut to letter contour, so that the letters thus built up may be employed for application to boards and for removal therefrom.

While various changes may be made in the detailed construction and in the method of carrying out the same, such changes shall be within the spirit and scope of the present invention as defined by the appended claim.

What is claimed is:

A raised laminated lettering structure comprising a base sheet, laminations superimposed upon one another and upon the base sheet, the uppermost lamination of which being rolled down at its side edge over the edges of the laminations lying therebelow so as to cover up the latter edges, and a narrow lamination lying upon the uppermost lamination and pressed thereinto to be substantially flush with same.

PHILIPP WILLNER.

REFERENCES CITED

The following references are of record in the file of this patent:

UNITED STATES PATENTS

| Number | Name | Date |
|---|---|---|
| 332,444 | Schwartz | Dec. 15, 1885 |
| 663,892 | Hansen | Dec. 18, 1900 |
| 1,734,736 | Lotz | Nov. 5, 1929 |
| 2,043,809 | Papp | June 9, 1936 |
| 2,116,471 | Nelson | May 3, 1938 |
| 2,181,044 | Brown | Nov. 21, 1939 |
| 2,192,163 | Metreger | Feb. 27, 1940 |
| 2,331,740 | Flint | June 15, 1943 |

FOREIGN PATENTS

| Number | Country | Date |
|---|---|---|
| 283,085 | Great Britain | Jan. 5, 1928 |